United States Patent
Perriard et al.

(10) Patent No.: US 7,770,461 B2
(45) Date of Patent: Aug. 10, 2010

(54) BRAKE-FORCE-SENSING DEVICE FOR VEHICLE RUNNING GEARS

(75) Inventors: Jacques Perriard, Romont (CH); Felix Schmid, Belfaux (CH)

(73) Assignee: Vibro-Meter SA (CH)

( * ) Notice: Subject to any disclaimer, the term of this patent is extended or adjusted under 35 U.S.C. 154(b) by 29 days.

(21) Appl. No.: 11/692,689

(22) Filed: Mar. 28, 2007

(65) Prior Publication Data

US 2007/0227239 A1    Oct. 4, 2007

(30) Foreign Application Priority Data

Mar. 29, 2006  (CH) .................................. 0499/06
Jul. 6, 2006   (EP) .................................. 06405286

(51) Int. Cl.
    *G01B 7/16*   (2006.01)
    *G01L 1/04*   (2006.01)
    *G01L 5/28*   (2006.01)

(52) U.S. Cl. ........................ 73/767; 73/129; 73/862.45; 188/181 T

(58) Field of Classification Search ................... 73/131, 73/862.09–862.18, 862.195, 129, 862.01, 73/862.044, 862.045, 862.338; 188/181 T; 303/126, 112; 244/111
    See application file for complete search history.

(56) References Cited

U.S. PATENT DOCUMENTS

| | | | | |
|---|---|---|---|---|
| 3,201,977 A | * | 8/1965 | Kutsay | ........................ 73/766 |
| 3,426,586 A | * | 2/1969 | Kadlec Charles | ............ 73/767 |
| 3,625,053 A | * | 12/1971 | Laimins | ........................ 73/765 |
| 3,695,096 A | * | 10/1972 | Kutsay | .................. 73/862.045 |
| 3,857,452 A | * | 12/1974 | Hartman | ..................... 177/139 |
| 4,175,428 A | * | 11/1979 | Eilersen | ................. 73/862.626 |
| 4,474,060 A | | 10/1984 | Crossman | ..................... 73/129 |
| 4,530,245 A | * | 7/1985 | Jacobson | ..................... 73/768 |
| 6,273,613 B1 | | 8/2001 | O'Brien et al. | ............. 384/448 |
| 6,408,688 B2 | * | 6/2002 | Foley et al. | .................... 73/129 |
| 6,766,685 B2 | * | 7/2004 | Foley et al. | .................... 73/129 |
| 6,805,224 B2 | * | 10/2004 | Lauch et al. | ............ 188/1.11 E |
| 2002/0020213 A1 | * | 2/2002 | Foley et al. | .................... 73/129 |
| 2006/0266561 A1 | * | 11/2006 | Dellac et al. | ................. 177/136 |

OTHER PUBLICATIONS

Berme, N. and Morr, D. R. "Dynamometers." Wiley Encyclopedia of Electrical and Electronics Engineering. Ed. J. Webster. 1999. 100-107.*

* cited by examiner

*Primary Examiner*—Lisa M Caputo
*Assistant Examiner*—Punam Patel
(74) *Attorney, Agent, or Firm*—Ostrolenk Faber LLP

(57) ABSTRACT

In a measuring device for the measurement of the brake torque on an aircraft landing gear, a connecting element that is transversally loaded by the brake torque is provided with measuring elements which produce a measuring signal in function of a deformation of the connecting element. In one of two preferred variants, the measuring elements are attached to the surface of a cavity in the connecting element, and in the second preferred embodiment, a corresponding sensor is introduced into the connecting element as a whole, the sensor being so designed that deformations affect its enclosure and deform the latter as well.

9 Claims, 5 Drawing Sheets

PRIOR ART

BRAKE-FORCE-SENSING DEVICE FOR VEHICLE RUNNING GEARS

CROSS REFERENCE TO RELATED APPLICATIONS

This application claims the benefit of the filing date of Switzerland Patent Application No. 00499/06 filed 29 Mar. 2006 and European Patent Application No. 06405286.3 filed 6 Jul. 2006, the disclosure of which is hereby incorporated by reference.

BACKGROUND OF THE INVENTION

1. Field of the Invention

The present invention relates to a device for measuring the brake torque in a vehicle undercarriage in which the brake torque is transmitted to said vehicle undercarriage by a bar-shaped member and said bar-shaped member is loaded transversely by said brake torque. The invention further relates to a sensor for such a device.

2. Prior Art

The brakes of aircraft include stacks of mutually interleaved brake disks that are pressed against each other by hydraulic or electric actuators. One of the stacks is connected to the respective wheel. The other stack is connected to the stationary part of the landing gear for receiving the brake torque. In order to transmit the brake torque, i.e. the torque that appears when the brakes are activated, to the landing gear, the latter stationary stack is non-rotatably locked to the landing gear in a suitable manner. Generally, this is achieved by a fastening device that is arranged on the stationary stack eccentrically with respect to the axis of the wheel, in the simplest case a bore. A bolt serves for connecting the stationary stack to the landing gear directly or via a torque takeout arm. This bolt is highly stressed by the torque in the transverse direction and is consequently made of a high-strength material. Since its diameter is generally relatively large, it is hollow in order to reduce its weight.

For various reasons it is desirable to measure the momentary braking action. To this end, U.S. Pat. No. 4,474,060 suggests designing the bushing that is normally arranged between the mentioned bolt and the respective receiving opening, as a torque sensor. However, the disadvantage of this solution is that it involves a modification of the elements which serve for force transmission, thereby causing considerable expenditures for the certification of this solution. The certification is relatively time-consuming and costly and may furthermore be required, in the extreme case, for each aircraft type separately.

Similar problems in the measurement of the brake torque may also be encountered in other types of vehicles whose braking systems are similar to those of aircraft.

SUMMARY OF THE INVENTION

It is therefore an object of the present invention to provide a device for measuring the brake torque in a vehicle undercarriage, wherein the device can be mounted without substantial interventions in the transmission path of the brake torque.

This is accomplished by a device for measuring the brake torque in a vehicle undercarriage in which the brake torque is transmitted to said vehicle undercarriage by a bar-shaped member and said bar-shaped member is loaded transversely by said brake torque, wherein said bar-shaped member is essentially hollow and said measuring means are located in the interior of said bar-shaped member.

Accordingly, the principle of the invention consists in providing the bolt that serves for transmitting the brake torque with means for measuring its deformation. The arrangement is based upon the observation that by the arising great forces, the bolt is deformed to an extent that allows a measurement. More specifically, the measuring device can be arranged in the interior of the hollow bolt. One possibility thereof is its direct attachment to the surface of the bolt, e.g. in the form of strain gauges.

Another possibility consists in an indirect coupling. To this end, the bolt is provided with a sensor that is inserted therein in a suitable manner so as to contact the interior of the bolt so closely that it is deformed along with the bolt during braking. In its interior, the sensor is provided with strain gauges or the like to detect the arising tensions and/or deformations. Furthermore, in both cases, evaluating electronics may additionally be provided for conditioning the measuring signals locally.

BRIEF DESCRIPTION OF THE DRAWINGS

The invention shall be explained in more detail by means of preferred exemplary embodiments and with reference to figures.

DETAILED DESCRIPTION OF PREFERRED EMBODIMENTS

Figure 1:
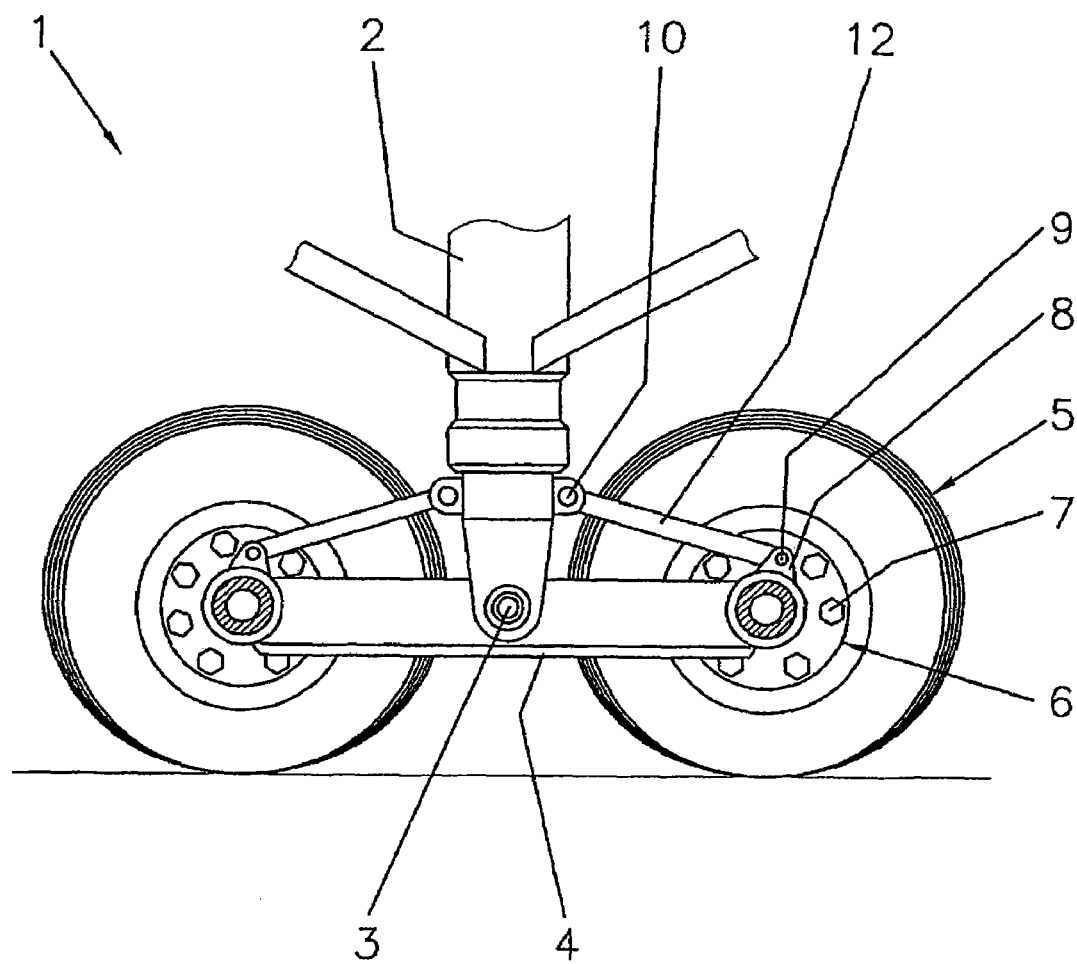
FIG. 1 schematic illustration of a conventional aircraft landing gear (bogie)

FIG. 1 shows the basic structure of an aircraft landing gear 1. On a landing gear strut 2, a bogie train 4 is mounted by a pivot 3. The bogie train supports wheels 5. Wheels 5 are provided with brakes 6 that are actuatable by (e.g. hydraulic) actuators 7. The stationary disk stack of brake 6 has a lever 8 with a bore 9. A torque arm 12 is fastened to bore 9 as well as to an attachment point 10 and transmits the brake torque from brake 6 to landing gear 1 during brake application.

The depicted basic construction of an aircraft landing gear corresponds to the state of the art for larger aircraft. Alternatively, instead of using torque arm 12, it is also common, especially in smaller aircraft, to transmit the torque from the brake directly to the landing gear, e.g. by a direct bolt connection.

Figure 2:
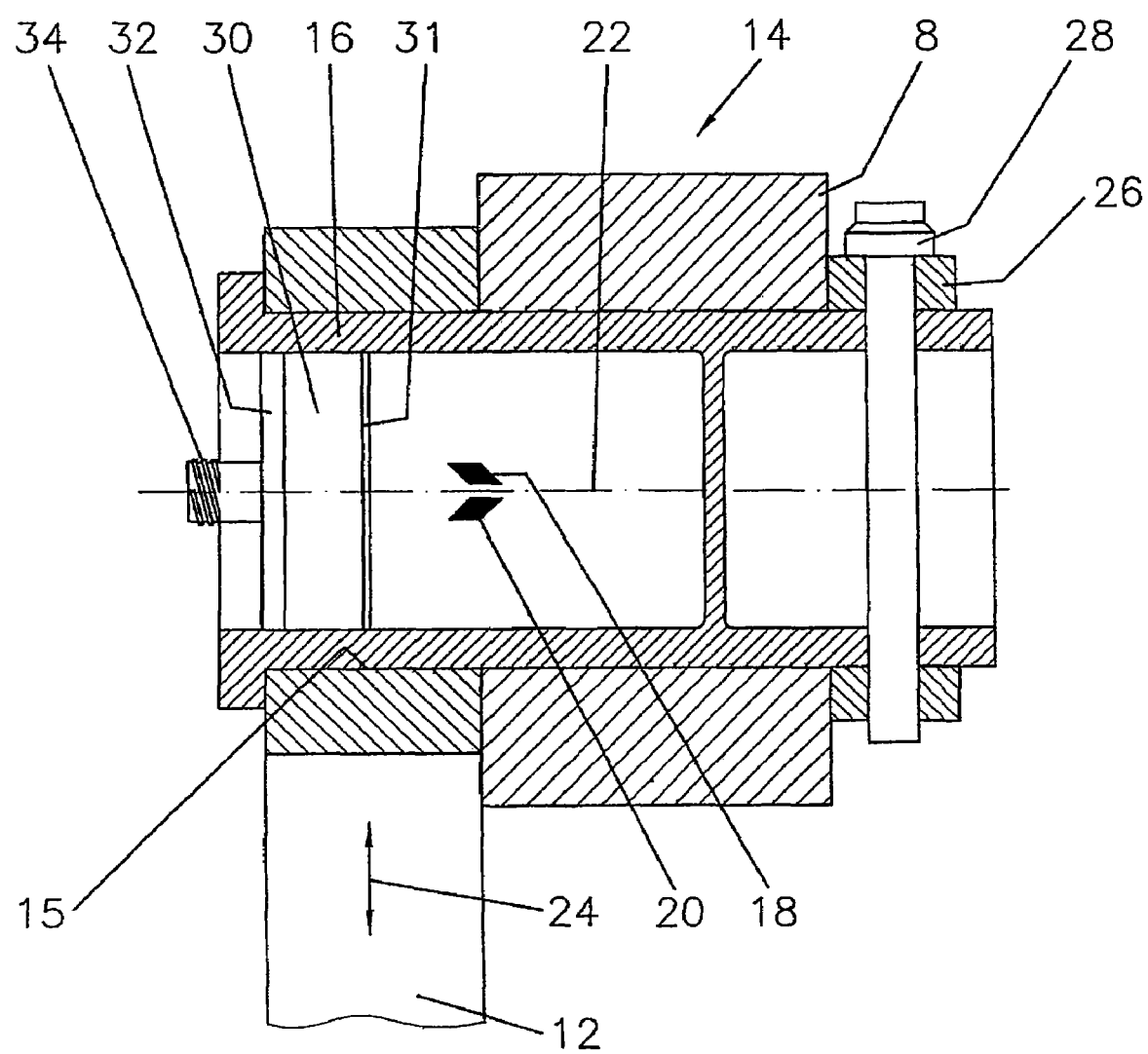
FIG. 2 longitudinal section of a bolt with a first embodiment of the measuring device.

FIG. 2 shows a longitudinal section of the connection between brake torque arm 12 and the stationary part 14 of brake 6, the above-mentioned lever 8 being considered as belonging to stationary part 14.

Bolt 16 extends through bore 9 in lever 8 as well as through a bore 15 at the end of brake torque arm 12. Bolt 16 is made of a high-strength material and is largely hollow to reduce its weight. However, during brake application, it is still noticeably deformed. For example, a deformation of 4/10 mm (0.4 mm) has been observed in a bolt having an internal diameter of 50 mm.

In order to measure this deformation, strain gauges 18, 20 are attached to the inner wall of bolt 16. More specifically, strain gauges 18, 20 are arranged such that their measuring directions form an angle of approx. 45° with longitudinal axis 22 of bolt 16, and, thus, form a total angle of 90° between their measuring directions. They are furthermore arranged symmetrically to the plane that is parallel to axis 22 and perpendicular to the brake torque (arrow 24). This arrangement allows a measurement of the shearing strain. At the same time, this arrangement allows separating the deformation of bolt 16 that results from the brake forces from other causes such as vibrations and shocks.

If two strain gauges are used, they may form part of a half-bridge arrangement. Preferably, however, a second pair (not shown) is provided opposite strain gauge pair 18, 20 to form a full measuring bridge. To this end, as the case may be, an antiparallel configuration or an inverted arrangement (mirrored on the plane perpendicular to longitudinal axis 22) will be used. Due to the spatial proximity of strain gauges 18, 20 it is possible to prefabricate them as a unit with the correct mutual alignment of the measuring directions. Suitable circuits are known in the art per se.

For the function of the measuring arrangement it is important that the strain gauges are in the correct position relative to the action of brake torque 24. For this purpose, a ring 26 may be mounted on stationary part 14. A pin 28 is pushed through this ring 26 and bolt 16 and is secured in a suitable manner, thereby locking bolt 16 against rotation.

On a circuit board 31 inserted in the same recess 30 in bolt 16 where strain gauges 18, 20 are located, a circuit for driving strain gauges 18, 20 and evaluating their signals is provided. Recess 30 is sealed by a plate 32 in order to protect circuit board 31 and strain gauges 18, 20 from environmental influences. In the center of the latter there is an electric connector 34, here a threaded connector, to which the power supply and signal lines for the measuring arrangement are connected.

Thus, the entire measuring device can be attached to bolt 16 without requiring a recertification of this safety-relevant part. Due to the fact that strain gauges are used which are designed for the measurement of the shearing strain and pairs of which can thus be prefabricated in the required configuration, providing a bolt 16 with these strain gauges while maintaining their correct orientation with respect to one another and to bolt 16 is simplified. Moreover, two pairs of strain gauges may be used which form a measuring full bridge.

Figure 3:
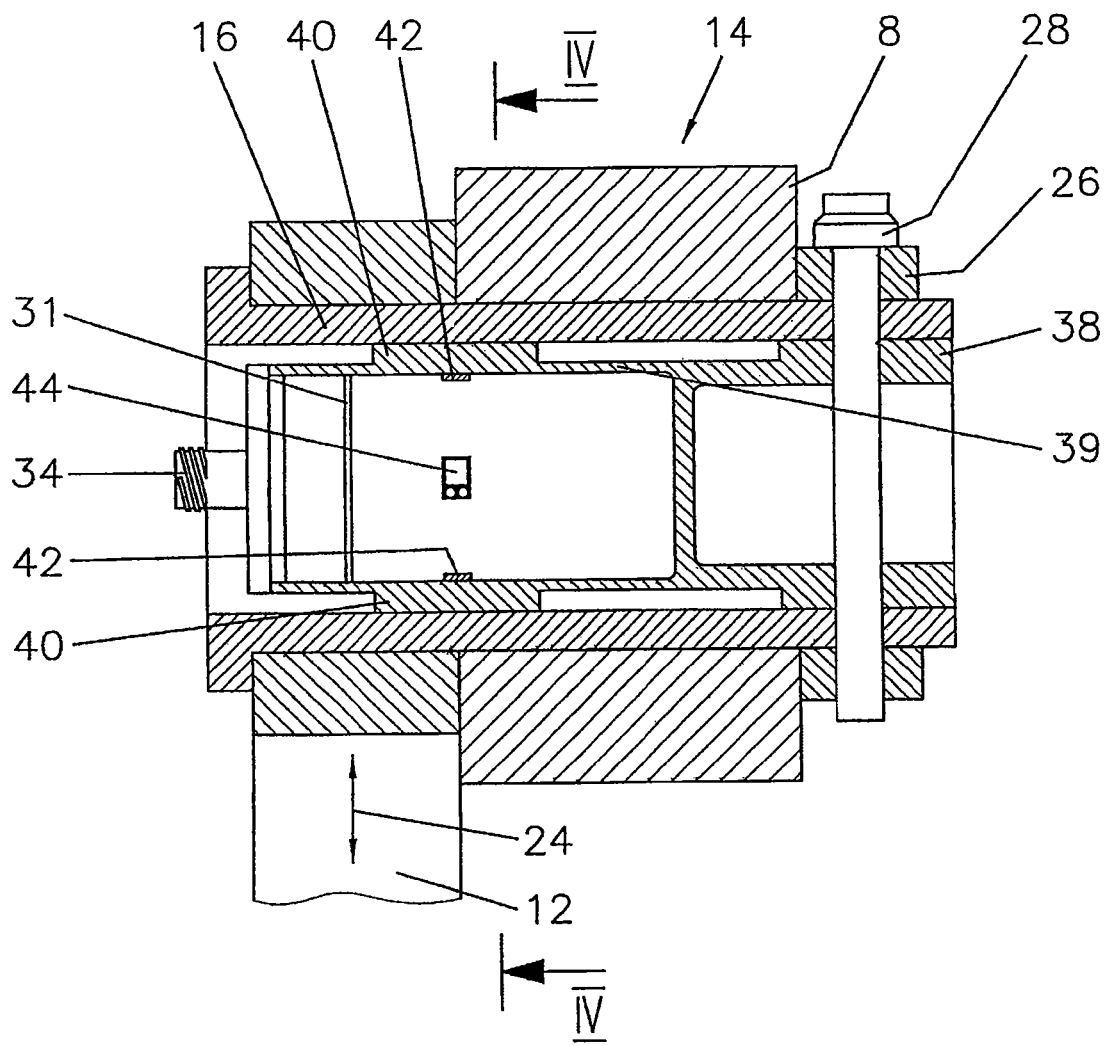
FIG. 3 longitudinal section in analogy to FIG. 2 of a second embodiment of the invention.
Figure 4:
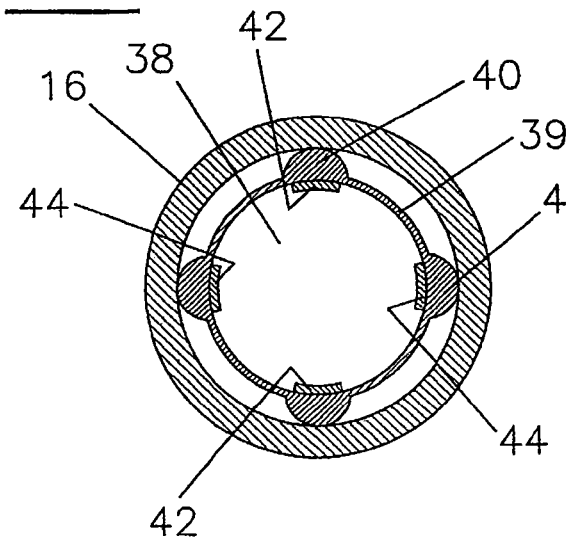
FIG. 4 cross-section according to IV-IV in FIG. 3 in unstressed condition.
Figure 5:
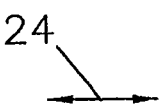
FIG. 5 cross-section as in FIG. 4 in stressed condition.

A different attachment of the measuring device is shown in the embodiment of FIG. 3. The parts that correspond to FIG. 2, such as brake torque arm 12, stationary brake part 14, and the orientation means for the measuring device including ring 26 and pin 28, are designated by the same reference numerals and have the same functions. In this embodiment, a sensor 38 is inserted into bolt 16 whose enclosure 39 is adapted to the internal diameter of bolt 16 and is slightly press-fitted such that it is deformed along with bolt 16. In the present embodiment, the enclosure is provided with four projections 40 (see FIGS. 4, 5). The projections have a rounded cross-section and are regularly distributed over the circumference of sensor enclosure 39, i.e. at a mutual angle of 90°. More specifically, sensor 38 is preferably arranged in bolt 16 such that the connecting lines between opposed projections 40 are parallel or perpendicular to brake torque 24 in order to obtain an optimum transmission of the deformation to sensor enclosure 39.

As appears in FIG. 3, projections 40 only extend over a part of the total length of sensor 38. More particularly, they are provided at the junction between stationary brake part 14 and torque arm 12. For support purposes, further such projections are provided at the enclosure end and are traversed by orientation pin 28.

Enclosure 39 of sensor 38 has to be sufficiently flexible to follow the deformation of bolt 16. For the same reason, projections 40 have to be sufficiently rigid relative to enclosure 39 as a whole to transmit this deformation to enclosure 39 as completely as possible.

In the interior of the enclosure, strain measuring means 42, 44 are arranged, more particularly in the form of strain gauges. More specifically, strain gauges 42, 44 are arranged such that they are sensitive to an angular strain or a compression strain of the surface, i.e. a deformation in parallel to the circumference in the plane perpendicular to longitudinal direction 22 of bolt 16. This arrangement is based on the observation that bolt 16 is subject to both an axial strain or compression strain and an ovalization, i.e. during brake application, the cross-section of bolt 16, which is normally circular in the unstressed condition, becomes oval.

For a better detection of this ovalization, four sets of strain gauges 42, 44 are regularly distributed over the circumference, i.e., at a mutual angle of 90°. Thus, the strain gauges 42, 44 placed in the enclosure 39 at a mutual angle of 90° detect a deformation in the enclosure 39 in parallel to the circumference in the plane perpendicular to the longitudinal direction 22 of bolt 16.

The sensor again contains a circuit board 31 with a conditioning circuit, and at one end of the sensor, a connector 34 for the electric connection of the sensor is provided.

Figure 6:
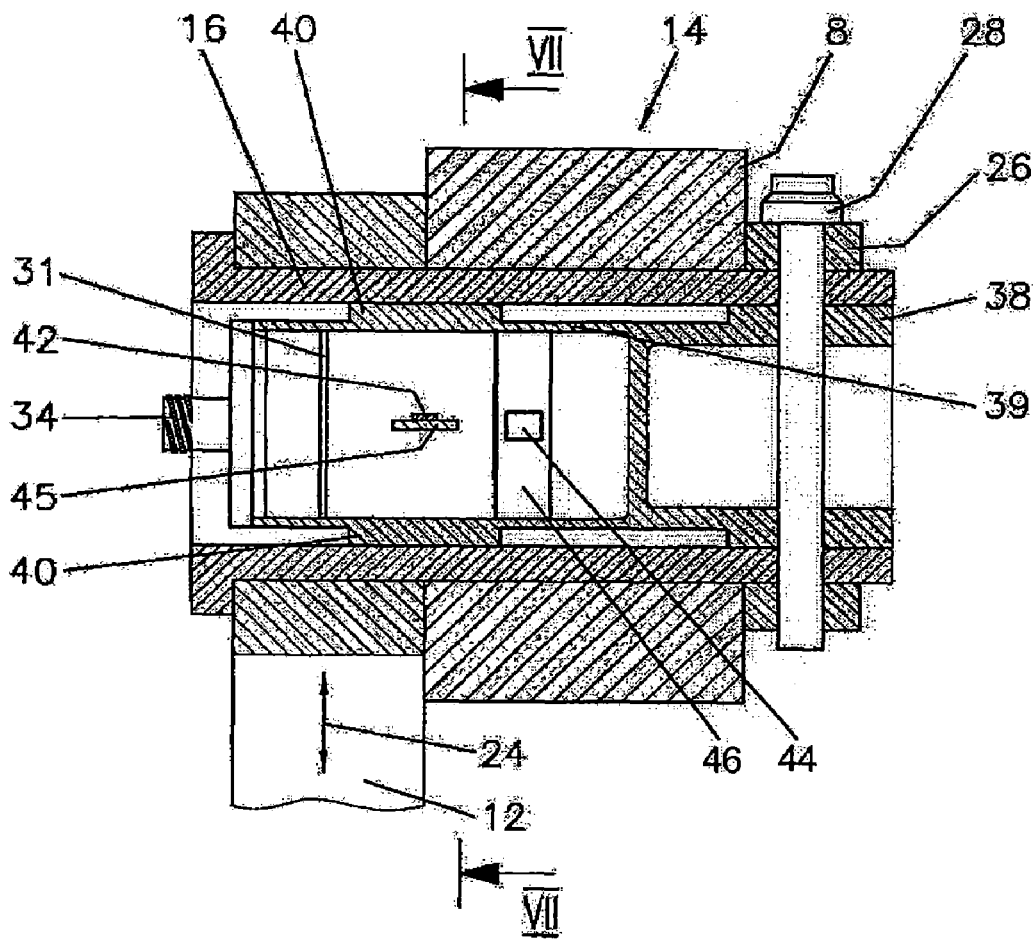
FIG. 6 longitidinal section in analogy to FIG. 2 of a third embodiment of the invention.
Figure 7:
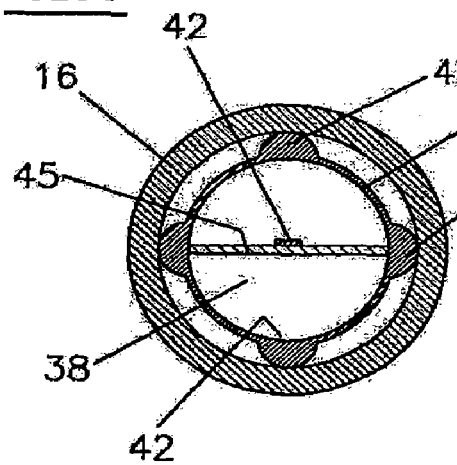
FIG. 7 cross-section according to VII-VII in FIG. 6 in unstressed condition.
Figure 8:
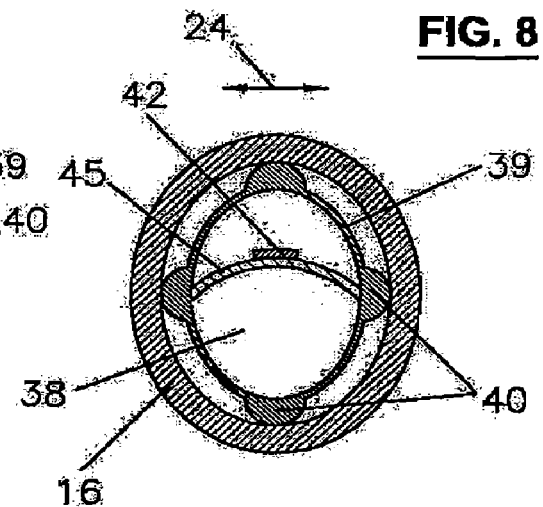
FIG. 8 cross-section as in FIG. 7 in stressed condition.

Another embodiment of an attachment of the measuring device according to the invention is shown in FIGS. 6 to 8, wherein the sensor 38 comprises said enclosure 39 which is internally provided with a support 45, 46 that connects points of the enclosure 39 that are spaced apart. The support 45, 46 comprises a first bar 45 and a second bar 46 which extend radially and essentially perpendicularly to each other. FIG. 6 shows both the first bar 45 and the second bar 46, while FIGS. 7 and 8 show only the first bar 45.

A measuring means 42, 44 is arranged on each bar 45, 46 of said support such that deformations imparted on said enclosure 39 from the exterior are measurable by said measuring means 42, 44 directly or through resulting deformations of said support 45, 46. This way a measurement of a radial deformation is possible that is less dependent upon the angular orientation. Furthermore, a distinction between different types of deformations can be achieved.

Figure 9:
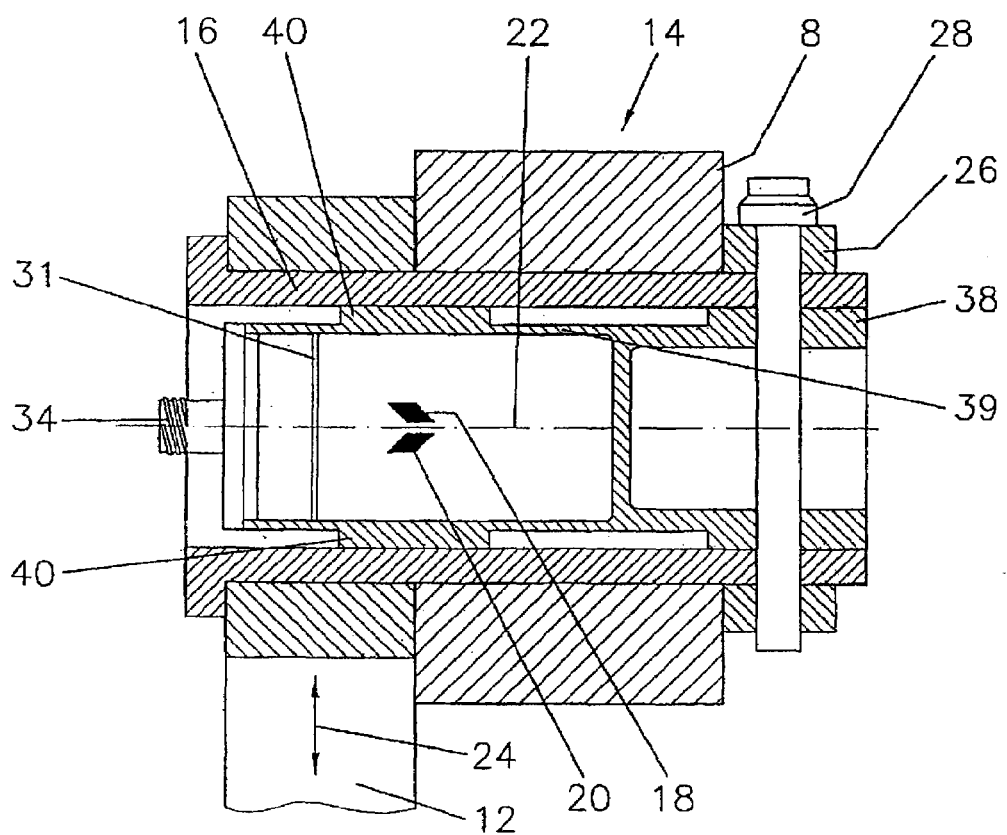
FIG. 9 longitudinal section in analogy to FIG. 2 with the first embodiment of the measuring device in a sensor enclosure.

FIG. 9 illustrates the arrangement of strain gauges 18, 20 in pairs according to FIG. 2 in a sensor enclosure 39.

From the preceding description, numerous modifications are accessible to those skilled in the art without leaving the scope of the invention as defined by the claims. In particular, it is conceivable:

- to use other strain measuring elements than strain gauges;
- a different fixating arrangement than pin 28 and ring 26 for defining the orientation of the measuring elements relative to brake torque 24;
- to use a greater number of measuring elements while possibly omitting an orientation device (ring 26, pin 28) and providing a corresponding evaluation of the signals in order to obtain a measurement in any angular orientation of the measuring arrangement with respect to torque 24.
- A brake torque measuring device (strain gauges 18, 20; sensor 38) is additionally or alternatively mounted in another location where a suitable connecting element is situated which is transversely loaded by the braking force respectively by the corresponding torque, e.g. in attachment point 10 or in the bolt that connects the stationary brake part to the landing gear in landing gears having no torque arm 12.

The measuring means that are directly attached to bolt 16 measure the respective compression strain directly, i.e. they are e.g. arranged opposite each other in the direction of force 24.

A support (disk, wall portion) on which the measuring means are located is arranged in the bolts or in sensor 38. The measuring means deliver a signal as a function of the deformation of the support.

The invention claimed is:

1. Device for measuring the brake torque in a vehicle undercarriage in which the brake torque is transmitted to said vehicle undercarriage by a bar-shaped member, said bar-shaped member being loaded transversely by said brake torque, and measuring means being provided which are operatively connected mechanically to said bar-shaped member, said measuring means allowing a measurement of the strain or contraction of said bar-shaped member that is caused by said transverse load, wherein said bar-shaped member has an interior which is essentially hollow and said measuring means are located in the interior of said bar-shaped member,
wherein said measuring means detect an elongation in a measuring direction and at least two of them at a time are mutually aligned with their measuring directions such that the signals of said measuring means are additively or subtractively combinable into respective total signals, the total signal that may result from the transverse load during a brake application being greater than that of the individual measuring means while the total signal that may result from other transverse loads is a smaller signal than that of an individual measuring means,
wherein the measuring directions of two of said measuring means are arranged at an angle of essentially 90°, and
wherein said measuring means are located in an enclosure of a sensor that is inserted into a cavity of said bar-shaped member for extending into said cavity, at least a part of said enclosure being mechanically operatively connected to said bar-shaped member and said measuring means being mechanically operatively connected to said enclosure such that an oval deformation of said bar shaped-member is transmittable via said enclosure to said measuring means, wherein said enclosure deforms in conformity to said oval deformation of said bar-shaped member.

2. The device of claim 1, wherein said bar-shaped member is a hollow bolt that connects a torque takeout arm, which transmits said brake torque from the brake to said undercarriage, to said undercarriage of said vehicle or to a stationary part of the brake assembly.

3. The device of claim 1, wherein said measuring means are strain gauges.

4. The sensor for use in the device of claim 1, wherein the enclosure of the sensor has an internal surface on which said measuring means are arranged.

5. An aircraft comprising the sensor of claim 4.

6. The sensor for use in the device of claim 1, wherein the enclosure is provided on its outside with projections such that said sensor is inserted into said cavity of said bar-shaped member with essentially only said projections contacting the inner side thereof.

7. The sensor for use in the device of claim 1, wherein said sensor is provided with an orientation means that is operatively connectable to the bar-shaped member such that by said operative connection, said sensor is attachable to said bar-shaped member in an alignment in which said sensor approximately has its highest sensitivity to the deformation of said bar-shaped member by a transverse load.

8. An aircraft comprising the device of claim 1.

9. The device of claim 1, wherein a portion of an external surface of said enclosure of said sensor is radially spaced away from an internal surface of said bar-shaped member.

* * * * *